United States Patent
Tsai

(10) Patent No.: US 6,425,599 B1
(45) Date of Patent: Jul. 30, 2002

(54) COLLAPSIBLE TROLLEY

(76) Inventor: James Tsai, No. 103, Ta-Ming 1 Rd., Tung Pao Village, Tan Tzu Hsian, Taichung Hsien (TW)

( * ) Notice: Subject to any disclaimer, the term of this patent is extended or adjusted under 35 U.S.C. 154(b) by 0 days.

(21) Appl. No.: 09/703,640

(22) Filed: Nov. 2, 2000

(51) Int. Cl.$^7$ ................................................. B62B 1/04
(52) U.S. Cl. ......................... 280/652; 280/40; 280/654; 280/655; 280/47.29
(58) Field of Search ........................... 280/652, 40, 42, 280/654, 655, 47.27, 47.28, 47.29

(56) References Cited

U.S. PATENT DOCUMENTS

| | | | |
|---|---|---|---|
| 4,281,849 A | * 8/1981 | Chandick et al. | ........... 280/655 |
| 4,335,895 A | * 6/1982 | Walker | .................... 280/47.13 |
| 4,917,392 A | * 4/1990 | Ambasz | ........................ 280/40 |
| 5,127,664 A | * 7/1992 | Cheng | .......................... 280/655 |
| 5,161,811 A | * 11/1992 | Cheng | .......................... 280/30 |
| 5,338,054 A | * 8/1994 | Imai et al. | .................... 280/655 |
| 5,374,073 A | * 12/1994 | Hung-Hsin | ................... 280/30 |
| 5,464,244 A | * 11/1995 | Tsai | ............................. 280/655 |
| 5,468,005 A | * 11/1995 | Yang | ............................ 280/40 |
| 5,630,521 A | * 5/1997 | Waddell et al. | ................ 190/18 |
| 5,803,471 A | * 9/1998 | DeMars et al. | ................ 280/40 |
| 5,984,327 A | * 11/1999 | Hsich et al. | ............. 280/47.24 |
| 6,053,514 A | * 4/2000 | Su | ................................ 280/40 |

FOREIGN PATENT DOCUMENTS

CH  597785  *  3/1976  ............ A45C/13/38

* cited by examiner

*Primary Examiner*—J. J. Swann
*Assistant Examiner*—J. Allen Shriver
(74) *Attorney, Agent, or Firm*—Browdy and Neimark, P.L.L.C.

(57) ABSTRACT

A collapsible trolley includes a main member provided with a retractable pull rod and a handle; a carrier frame, which has one end pivotally provided on the main member and is rotatable between an extended position and a collapsed position; two wheel assemblies, each of which includes a wheel frame and a wheel, the two wheel frame being pivotally provided on the main member such that the two wheel assemblies can be rotated outwardly to a use position or rotated inwardly to a collapsed position; and two first gears and two second gears, in which the two first gears are provided on the carrier frame, the two second gears being respectively provided on the wheel frames of the two wheel assemblies and inter-engaged with the two first gears. When the carrier frame is rotated to its extended position, it can bring the two wheel assemblies to rotate to their use position. When the carrier frame is rotated to its collapsed position, it can bring the two wheel assemblies to their collapsed position.

15 Claims, 6 Drawing Sheets

COLLAPSIBLE TROLLEY

BACKGROUND OF THE INVENTION (a) Field of the Invention

The invention relates to a trolley, more particularly to a collapsible trolley.

(b) Description of the Prior Art

U.S. Pat. No. 4,917,392 discloses a collapsible luggage carrier including two wheeled carriages, each of which is provided with a substantially S-shaped cam slot. When a base member is rotated outwardly to its extended position, by means of the abutting action of the two cam slots, the two wheeled carriages can be rotated to the extended position in which they are parallel to each other. When the base member is rotates inwardly to its collapsed position, the two wheeled carriages can be rotated to a collapsed position.

In the above-described structure, the base member will abut against the edges of the cam slots when rotating between the extended and collapsed position and may damage the predetermined shape of the cam slots after a period of use so that the wheeled carriages cannot reach the predetermined extended or collapsed position. In a worse case, the structure of the wheeled carriages may be damaged. In addition, in view of the structural strength of the wheeled carriages, the size of the wheeled carriages must be above a certain size, and the size of the luggage carrier has to be above a certain size; therefore, it cannot meet the current trend for compact products.

SUMMARY OF THE INVENTION

The primary object of this invention is to provide a collapsible trolley that is extendable and collapsible by another driving mechanism.

In order to achieve the above-mentioned object, the collapsible trolley of the invention includes a main member; a carrier frame having one end pivotally provided on the main member so that the carrier frame is rotatable outwardly to an extension position or inwardly to a collapsed position; two wheel assembles, each of which includes a wheel frame and a wheel, the two wheel frames being pivotally provided on the main member so that the two wheel assemblies can be rotated outwardly to a use position, or inwardly to a collapsed position; and two first gears and two second gears, the two first gears being provided on the carrier frame, the two second gears being respectively provided on the wheel frames of the two wheel assemblies, and engaged with the two first gears. When the carrier frame is rotated to its extended position, it can bring the two wheel assemblies to rotate to their use position. When the carrier frame is rotated to its collapsed position, it can bring the two wheel assemblies to their collapsed position.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
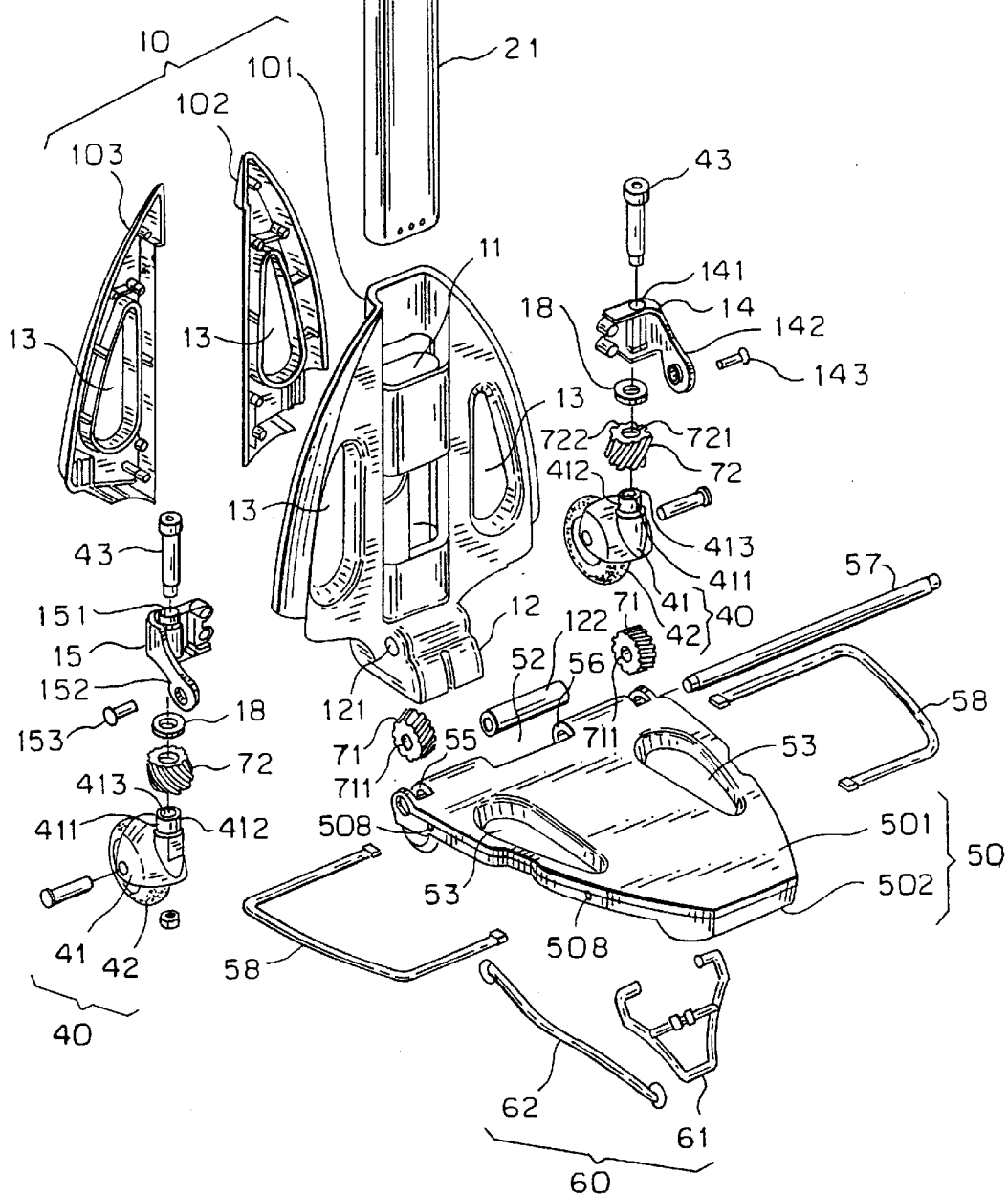
FIG. 1 is an exploded perspective view of the preferred embodiment of the invention.

With reference to FIG. 1, the preferred embodiment of a trolley according to the present invention includes a main member 10, which consist of a first, second and third sub-members 101, 102, 103. The first sub-member 101 has a rod seat 11, bottom end having a pivot seat 12 with a horizontally extending pivot hole 121 in which a freely rotatably shaft sleeve 122 is received. The center of the shaft sleeve 122 has a hexagonal hole. Left and right sides of the main member 10 each have a grip hole 13. Two wheel seats 14, 15 are symmetrical in shape, each having a shaft hole 141, 151 and an extension arm 142, 152. By means of coupling of the second and third sub-members 102, 103 with the first sub-member 101, the wheel seats 14, 15 can be secured on the left and right sides of the bottom end of the main member 10.

A retractable rod 21 has a top end with a handle seat 22 provided with a handle 23 thereon. The retractable rod 21 has its bottom end fixedly provided in the rod seat 11 of the main member 10 such that the handle 23 can be pulled out from or retracted into the main member 10. In addition, the handle utilizes a torsion spring (not shown) pivotally provided on the handle seat 22 of the retractable 22 such that the initial position of the handle 23 is oriented downwardly. In use, the handle 23 is rotated upwardly for grasping by the user. When not in use, the handle 23 will return to its original position to facilitate storage.

Two wheel assemblies 40, each of which includes a wheel frame 41 and a wheel 42 mounted pivotally thereon. Each wheel frame 41 has an upper end provided with a post 411, and outer side with a planar surface 412, and a top end with a threaded hole 413. The wheel assemblies 40 use two pivot pins 43 that respectively pass through axle holes 141, 151 of the wheel seats 14, 15 of the main member 10 and locked in the threaded holes 413, 413 of the wheel assemblies 41, 42 so as to be mounted pivotally on the two sides of the bottom end of the main member 10.

A carrier frame 50 is constituted by a first and a second frame members 501, 502. The carrier frame 50 has two grip holes 53. The center of its rear end has a pivot groove 52, each of the two sides having a cam slot 55. A pivot hole 56, substantially hexagonal, extends in a directional parallel to the rear side of the carrier frame 50 and passes through the pivot groove 52 and the two cam slots 55. The carrier frame 50 has the pivot groove 52 corresponding to the pivot seat 12 of the main member, and a shaft 57 (the cross section thereof being hexagonal so as to match the pivot hole 56) passes through the pivot hole 56 in the carrier frame 56 and the shaft sleeve 122 in the pivot hole 121 of the pivot seat 12 of the main member 10 so as to pivotally mount the carrier frame 50 on the main member 10. The extension arms 142, 152 of the wheel seats 14, 15 are located at the outer sides of the two ends of the shaft 57. Pins 143, 153 respectively pass through the extension arms 142, 152 of the wheel seats 14, 15 into the two ends of the shaft 57 for purposes of securing the shaft 57 and enhancing appearance. By means of the above construction, the carrier frame 50 can be rotated downwardly to an extended position (see FIGS. 2 and 4) where the carrier frame 50 is perependicular to the main member 10, or upwardly to a collapsed position (see FIGS. 3 and 5) where the carrier frame 50 is parallel to the main member 10.

Two extension members 58 are substantially U-shaped rod members, the two ends of which are respectively provided in the two through holes 508 in the left and right sides of the carrier frame, whereby the two extension members 58 can be respectively pulled outwardly to its extended position (see FIG. 2) so as to increase the carry surface of the carrier frame 50, or retracted inwardly to its collapsed position (see FIG. 3) to facilitate storage.

A positioning assembly 60 includes a leg 61 and a positioning rod 62. The leg 61 is pivotally mounted at the bottom side of the carrier frame 50. The positioning rod 62 has one end pivotally mounted on the leg 61, the other end thereof being pivotally mounted on the pivot seat 12 of the main member 10. As such, when the carrier frame 50 is rotated downwardly to its extended position, the positioning rod 62 can push the leg 61 to a position perpendicular to the carrier frame 50 (see FIG. 4). By utilizing the two ends of the positioning rod 62 to abut against the leg 61 and the main member 10 to thereby generate a limiting force, the carrier frame 50 can be positioned in the extended position. When the carrier frame 50 is rotated upwardly to its collapsed position, the positioning rod 62 can pull the leg 61 inwardly to be substantially parallel to the carrier frame 50 (see FIGS. 3 and 5). Likewise, by means of the two ends of the positioning rod 62 that abut against the leg 61 and the main member 10 and generate a limiting force, the carrier frame 50 can be positioned in the collapsed position.

Two first gears 71 and two second gears 72 are two sets of inter-engageable helical gears. Precisely speaking, the two first gears 71 are driving gears, and the two second gears 72 are driven gears. The rotational directions of the first and second gears 71, 72 are perpendicular to each other. The two first gears 71 are respectively mounted in the two cam slots 55 of the carrier frame 50. The center of the two first gears 71 has a hexagonal shaft hole 711 that correspond to the cross section of the shaft 57 for passage thereby, such that the carrier frame 50 can bring the two first gears 71 to rotate therewith. The two second gears 72 are respectively mounted on the post 411 of the two wheel frames 41. The shaft hole 721 in the center of the two second gears 72 has a planar surface 722 that corresponds to the planar surface 413 in the shaft holes 412 in the two posts 411 such that the second gears 72 can be rotated with the wheel frames 41. The two second gears 72 and the two wheel seats 14, 15 of the main member 10 are respectively provided with a bearing 18 therebetween so as to reduce the friction during rotation of the two second gears 72. The two first and second gears 71, 72 will drive the two wheel assemblies 40 to rotate when the carrier frame 50 is rotated.

In this embodiment, since the rotational axles of the carrier frame and the two wheel assemblies are perpendicular to each other, the two first and second gears 71, 72 are two sets of helical gears. However, a set of bevel gears or a set of worm gears (not shown in figure) can also achieve the same effects.

Figure 2:
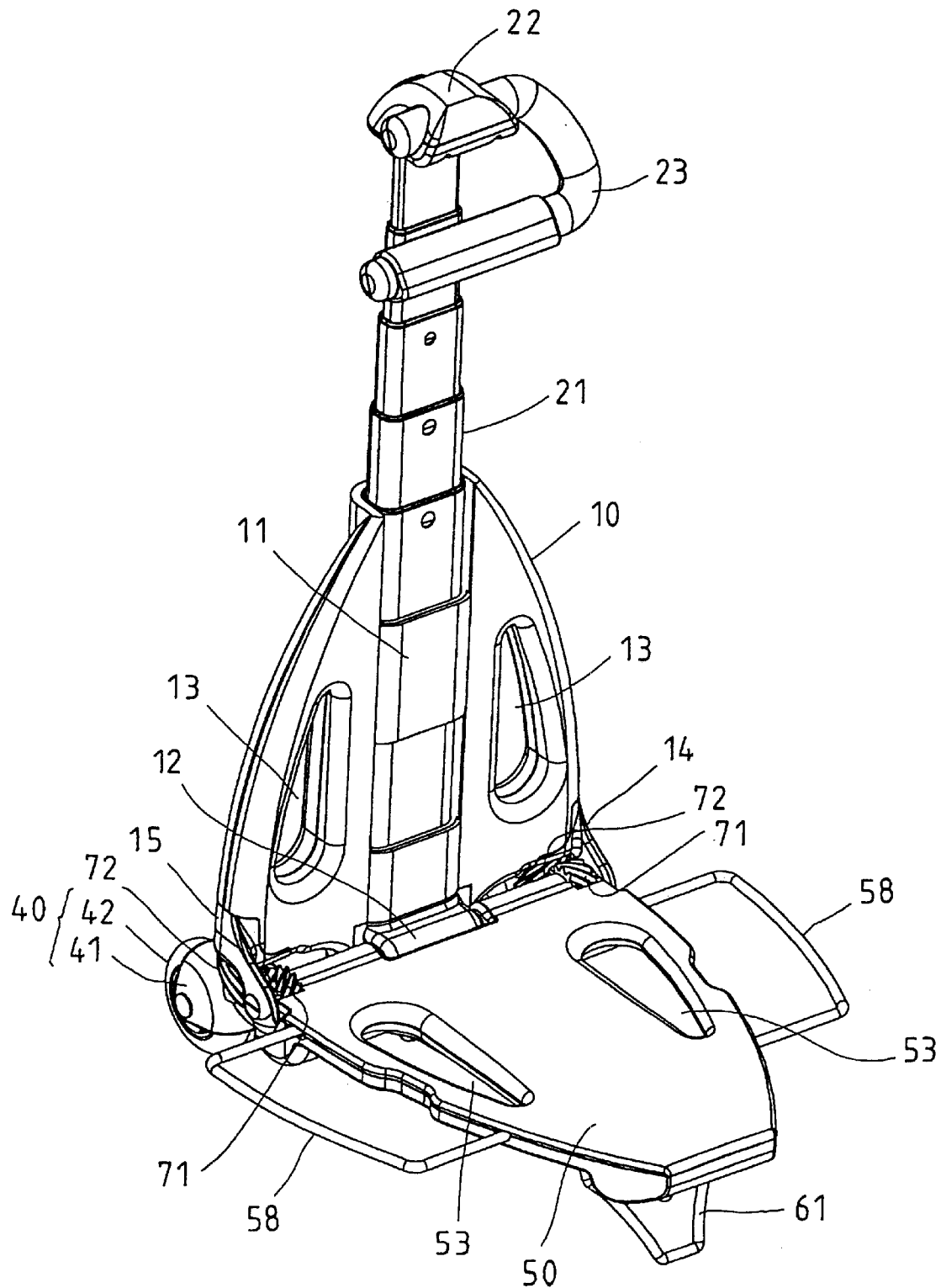
FIG. 2 is a perspective view of the preferred embodiment in an extended state.
Figure 4:
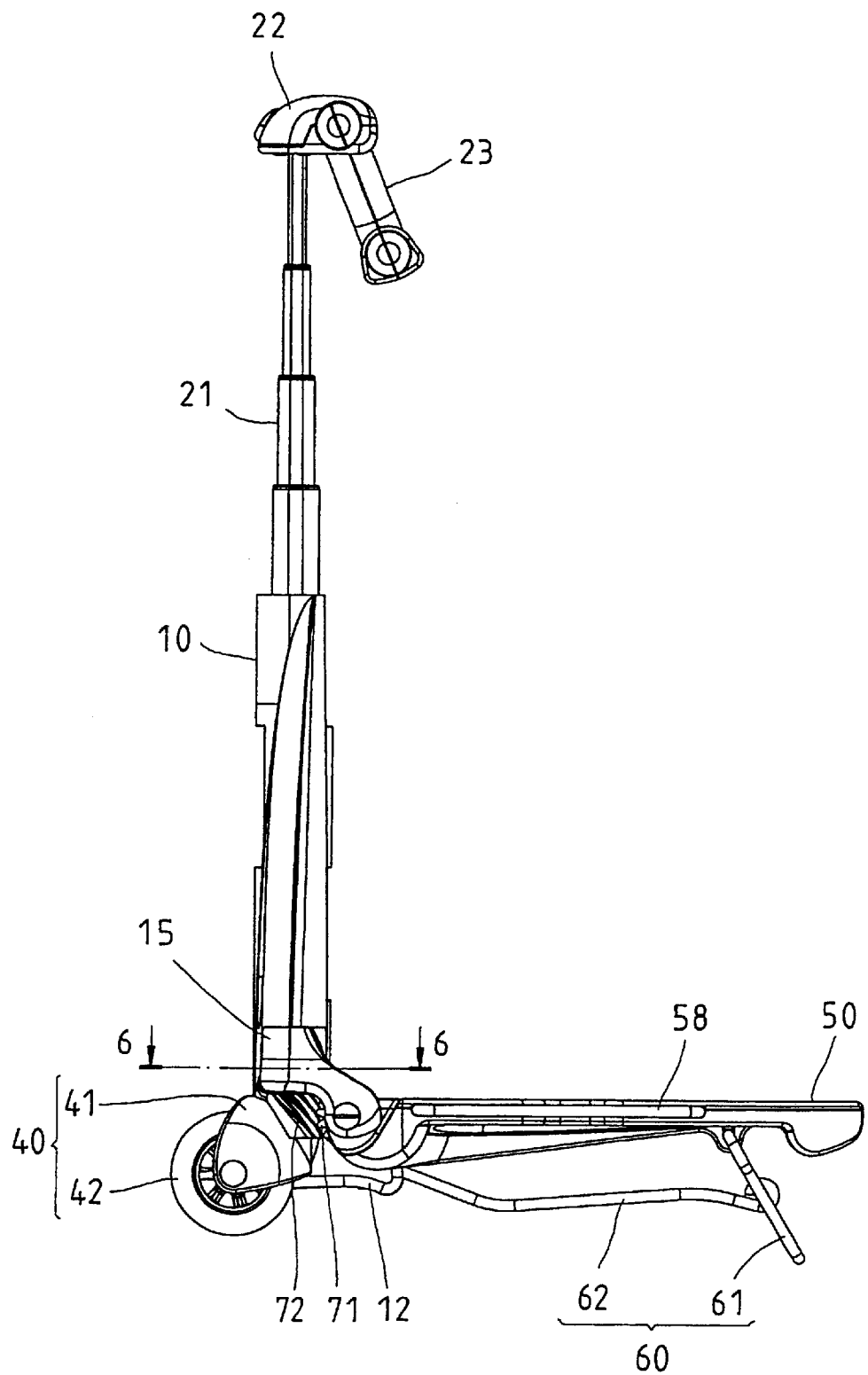
FIG. 4 is a side view of the preferred embodiment in the extended state.

When the collapsible trolley of this embodiment is in use, referring to FIGS. 2 and 4, the carrier frame 50 is rotated to its extended position. At this time, the two wheel assemblies 40 will be driven by the first and second gears 71, 72 to rotate to a use position in which the rotational axle of the two wheels 42 is parallel to the main member 10, and the leg 61 of the positioning assembly 60 is pushed outwardly by the positioning rod 62 such that the leg 61 and the two wheels 42 form a three-point supporting to enable the trolley of the invention to be placed on any surface. Finally, a force is applied to pull the handle 23 outwardly to extend the retractable pull rod 21 so as to facilitate pulling of the trolley by the user and to increase the carry surface of the carrier frame 50. Hence, the collapsible trolley of this invention is in the extended state as shown in FIG. 2.

Figure 3:
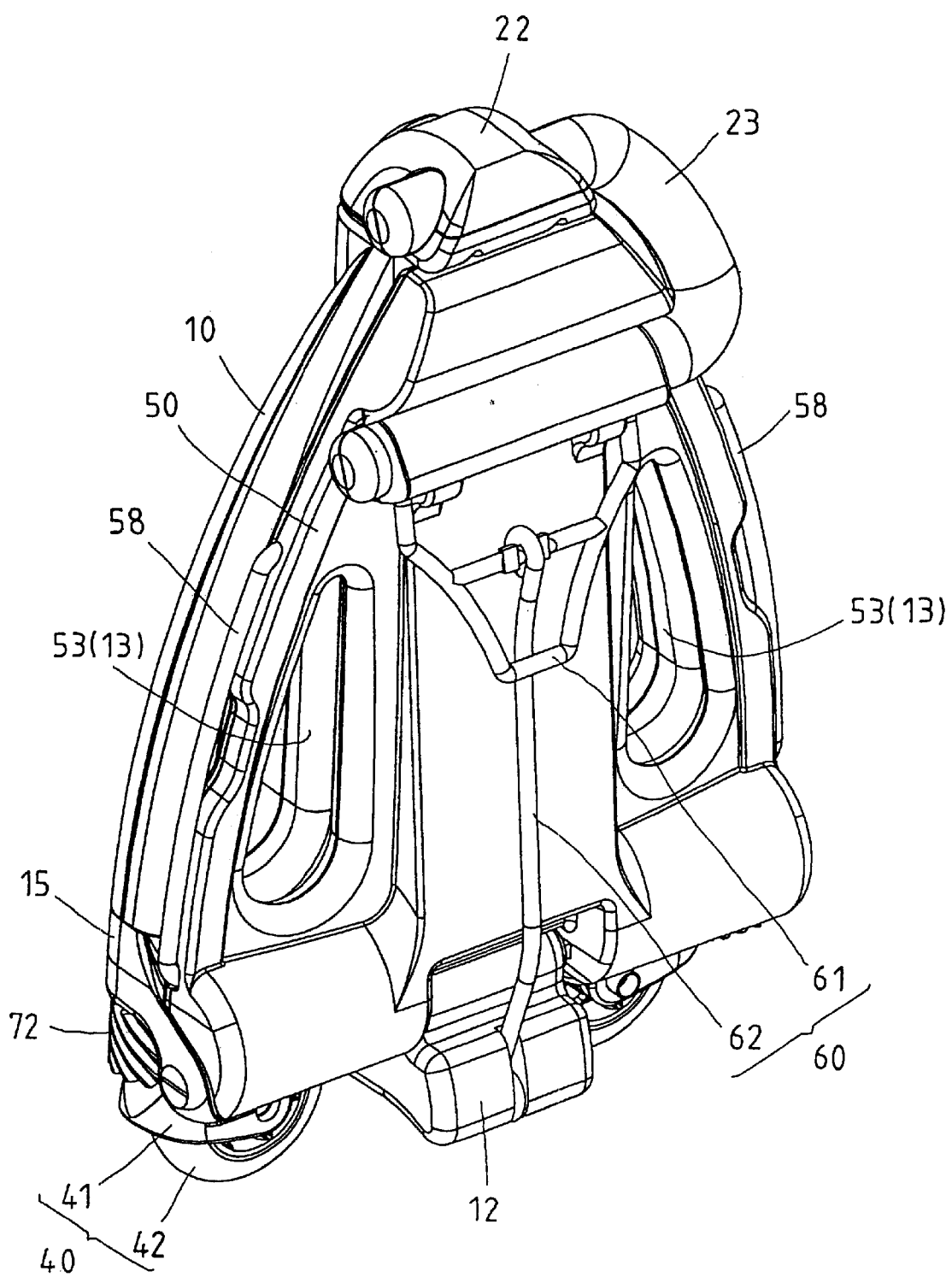
FIG. 3 is a perspective view of the preferred embodiment in a collapsed state.
Figure 5:
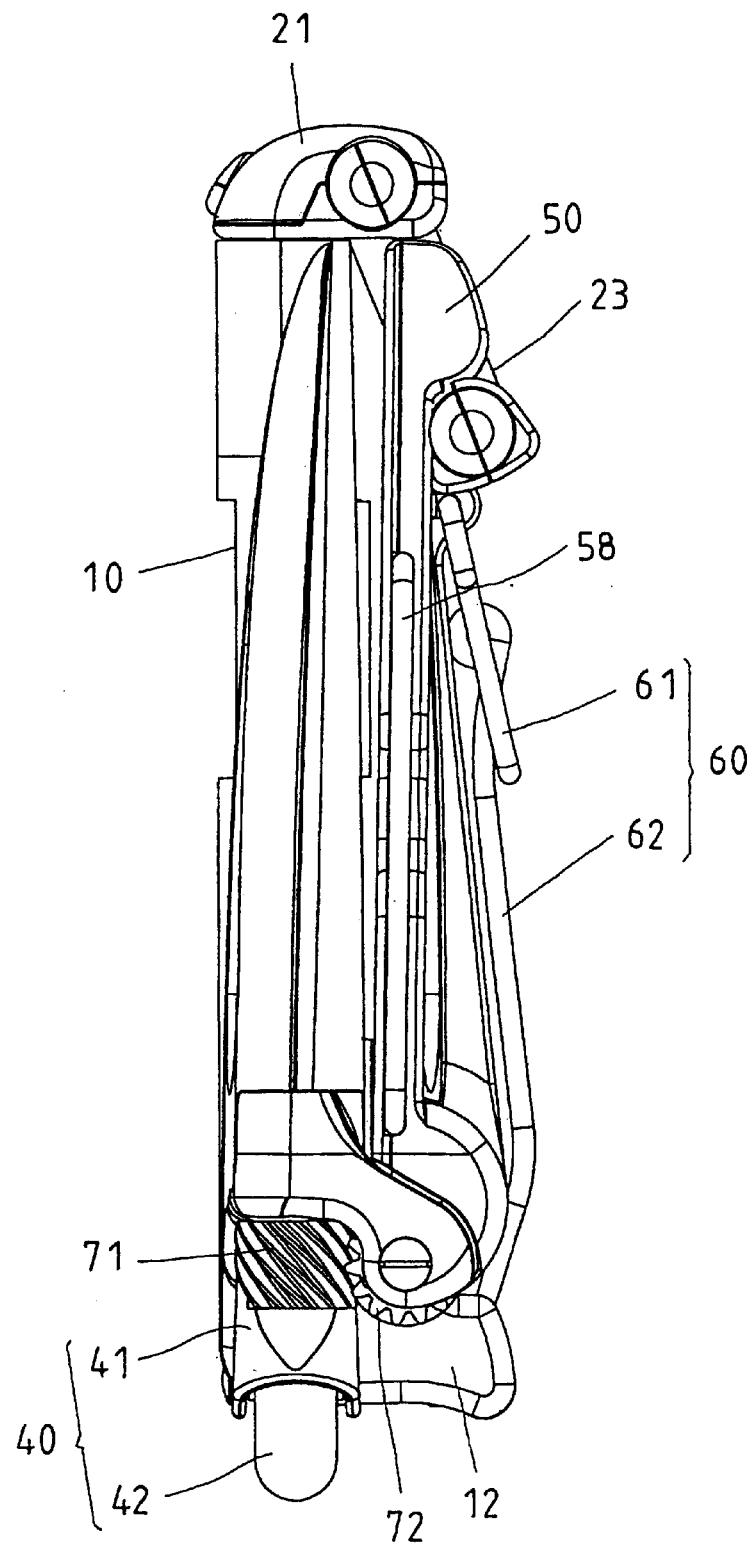
FIG. 5 is a side view of the preferred embodiment in the collapsed state.
Figure 6:
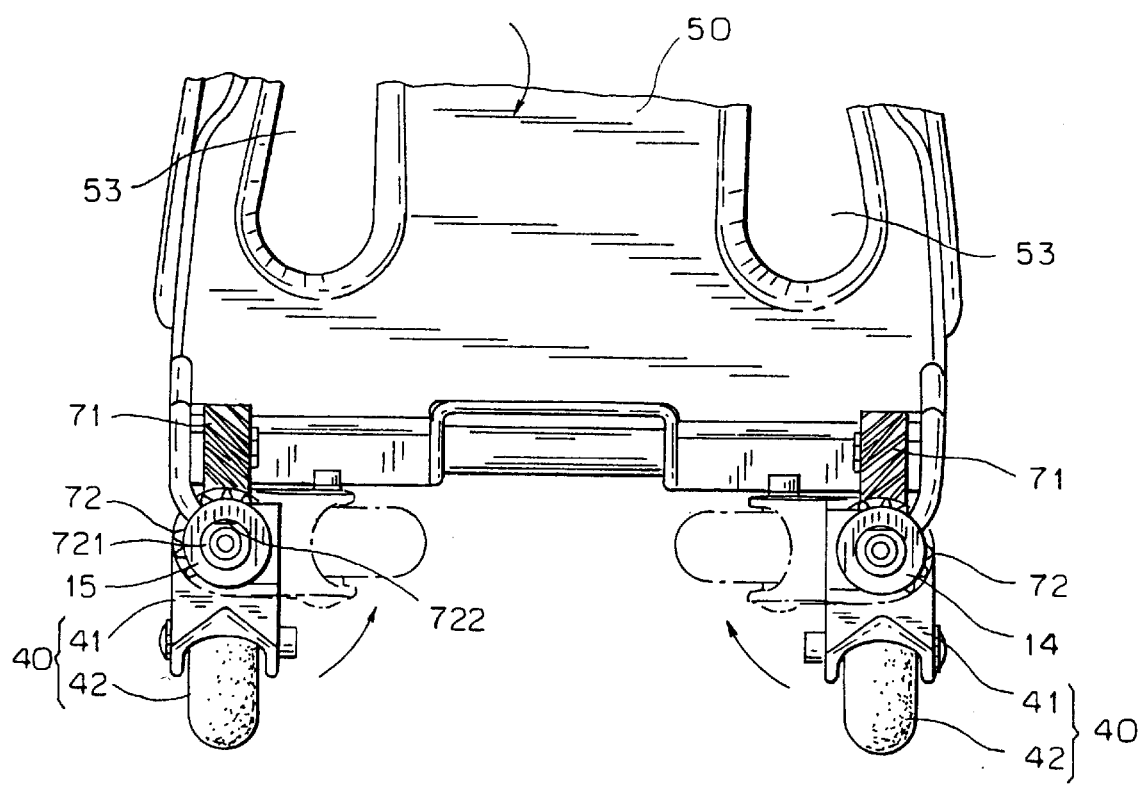
FIG. 6 is a sectional view taken along line 6—6 of FIG. 4.

When not in use, referring to FIGS. 3 and 5, the carrier frame 50 is rotated to its collapsed position. At this time, the two wheel assemblies 40 will be driven by the first and second gears 71,72 to rotat to the collapsed position (see FIG. 6) in which the rotational axle of the two wheels 42 is perpendicular to the main member 10. The positioning rod 62 of the positioning rod 60 will simultaneously pull the leg 61 to rest against the carrier frame 50. Then, the handle 23 is retractable into the main body. As mentioned above, since the handle 23 is resilient, it will press against the carrier frame 50 at this time. Besides, the grip holes 13, 53 in the main member and the carrier frame 50 can be gripped by the user to facilitate carrying.

The advantages of the present invention reside in that: By using the transmission of first gears 71 and the second gears 72 to achieve extension or collapsing of the trolley, the process of extension or collapsing is very smooth, and can enhance the quality of the product. In addition, the size of the collapsible trolley of this embodiment can be configured to be smaller. According to actual experiments conducted by the inventor, the collapsible trolley of this invention, when collapsed, occupies an area of approximately equivalent to that of an A-4 size paper, which meets the current trend for compact products.

What is claimed is:

1. A collapsible trolley, comprising:
   a main member having a handle;
   a carrier frame having one end pivotally mounted on said main member so that said carrier frame can be rotated to an extended position substantially perpendicular to said main body, or to a collapsed position substantially parallel to said main member;
   two wheel assemblies, each of which includes a wheel frame and a wheel mounted pivotally on said wheel frame, wherein said wheel frames are pivotally mounted on said main member such that said two wheel assemblies can be rotated to a use position in which rotational axle of said two wheels is substantially parallel to said main member, or to a collapsed position in which the rotational axle of said two wheels is substantially perpendicular to said main member; and
   two first gears and two second gears, wherein said two first gears are provided on said carrier frame, said two second gears being respectively provided on said wheel frames of said two wheel assemblies, and respectively engage said two first gears, whereby when said carrier frame is rotated to its extended position, said two wheel assemblies can be driven to rotate to their use position, and when said carrier frame is rotated to its collapsed position, said two wheel assemblies can be driven to rotate to their collapsed position;
   wherein said tail end of said carrier frame has two cam slots and a pivot groove, wherein said pivot groove corresponds to said pivot seat of said main member, said two cam slots being disposed for mounting of said two first gears, said carrier frame being pivotally mounted on said main member by means of a shaft passing through said pivot hole, said two first gears and said pivot seat of said main member.

2. The collapsible trolley of claim 1, further comprising a retractable pull rod, one end thereof being provided on said main member, said handle being provided at the other end of said retractable pull rod such that said handle can be pulled outwardly or retracted inwardly.

3. The collapsible trolley of claim 2, wherein said handle is pivotally engaged at the outer end of said retractable pull rod.

4. The collapsible trolley of claim 1, further comprising a positioning assembly to provide a positioning limiting force when said carrier frame is in the extended or collapsed position.

5. The collapsible trolley of claim 4, wherein said positioning assembly includes a leg and a positioning rod, wherein said leg is pivotally mounted at the bottom side of said trolley, said positioning rod having one end provided on said main member, the other end thereof being provided on said leg, such that when said carrier frame is rotated to the extended position, said positioning rod can push said leg outwardly so that said leg is substantially perpendicular to said carrier frame, and when said carrier frame is rotated to the collapsed position, said positioning rod pulls said leg inwardly so that said leg is substantially parallel to said carrier frame.

6. The collapsible trolley of claim 1, further comprising at least an extension member provided on said carrier frame so as to enhance the carry area of said carrier frame.

7. The collapsible trolley of claim 6, wherein the number of said extension member is two, which are respectively and pivotally provided on two sides of said carrier frame and can be pulled outwardly and retracted inwardly into said carrier frame.

8. The collapsible trolley of claim 1, wherein said main member includes a first sub-member, a second sub-member, and a third sub-member, wherein said first sub-member has a pivot seat, bottom end of said carrier frame having a pivot groove for accommodating said pivot seat.

9. The collapsible trolley of claim 1, wherein the bottom end of said main member is provided with two wheel seats for pivotal mounting of wheel frames of said two wheel assemblies, said two wheel seats being respectively provided with a post for mounting of said two second gears.

10. The collapsible trolley of claim 9, further comprising two bearings respectively mounted on said posts of said two wheel seats and located between said two second gears and said two wheel seats.

11. The collapsible trolley of claim 9, wherein each of said two wheel seats have an extension arm respectively engaged to each of the two ends of said shaft.

12. The collapsible trolley of claim 1, wherein said main member has at least a grip hole, said carrier frame having at least a grip hole.

13. The collapsible trolley of claim 1, wherein said first and second gears are a set of inter-engageable helical gears.

14. The collapsible trolley of claim 1, wherein said first and second gears are a set of inter-engageable bevel gears.

15. The collapsible trolley of claim 1, wherein said first and second gears are a set of inter-engageable worm gears.

* * * * *